United States Patent
Duan et al.

(10) Patent No.: US 7,953,421 B2
(45) Date of Patent: May 31, 2011

(54) DISPOSAL METHOD OF LOCATION INFORMATION REQUEST IN LOCATION SERVICE

(75) Inventors: Xiaoqin Duan, Guangdong (CN); Wenlin Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1192 days.

(21) Appl. No.: 10/563,259

(22) PCT Filed: Jul. 2, 2004

(86) PCT No.: PCT/CN2004/000737
§ 371 (c)(1),
(2), (4) Date: Sep. 22, 2006

(87) PCT Pub. No.: WO2005/004503
PCT Pub. Date: Jan. 13, 2005

(65) Prior Publication Data
US 2007/0054676 A1   Mar. 8, 2007

(51) Int. Cl.
*H04W 24/00* (2009.01)
(52) U.S. Cl. ............ 455/456.3; 455/456.1; 455/456.2; 455/456.4; 455/456.5; 455/456.6
(58) Field of Classification Search ............ 455/456.2, 455/456.5, 414.2, 412.2, 432.1, 456.1–456.6; 342/357.06, 357.12
See application file for complete search history.

(56) References Cited

U.S. PATENT DOCUMENTS

| | | | | |
|---|---|---|---|---|
| 6,163,701 A | * | 12/2000 | Saleh et al. | 455/456.2 |
| 7,016,693 B2 | * | 3/2006 | Guyot | 455/456.2 |
| 7,054,620 B2 | * | 5/2006 | Ewert et al. | 455/414.2 |
| 7,643,834 B2 | * | 1/2010 | Ioppe et al. | 455/456.3 |
| 2003/0060214 A1 | * | 3/2003 | Hendrey et al. | 455/456 |
| 2004/0253964 A1 | * | 12/2004 | Zhu | 455/456.3 |

(Continued)

FOREIGN PATENT DOCUMENTS

CN   1324553   11/2001

(Continued)

OTHER PUBLICATIONS

"Digital cellular telecommunications system (Phase 2+); Universal Mobile Telecommunications System (UMTS); Location Services (LCS); Functional description; Stage 2 (3GPP TS 23.271 version 5.6.0 Release 5); ETSI TS 123 271", ETSI Standards, European Telecommunications Standards Institute, Sophia-Antipo, FR, vol. 3-SA2, No. V560, Mar. 2003, XP014007894, ISSN: 0000-0001.

*Primary Examiner* — Lester Kincaid
*Assistant Examiner* — Nathan Mitchell
(74) *Attorney, Agent, or Firm* — Slater & Matsil, L.L.P.

(57) ABSTRACT

The present invention discloses a method for processing a location information request in a location service, comprising: a location information request initiator sending a location information request containing a processing indication to a location information request receiver; after receiving the location information request, the location information request receiver determining whether to perform synchronous processing or asynchronous processing for the location information request according to type of the processing indication, and then implementing corresponding processing for the location information request. This method is capable of effectively saving system resource of a LCS system, avoiding resource waste at a location service interface and increasing processing performance of a location service.

14 Claims, 3 Drawing Sheets

U.S. PATENT DOCUMENTS

| | | | |
|---|---|---|---|
| 2005/0043038 A1* | 2/2005 | Maanoja et al. | 455/456.1 |
| 2005/0232189 A1* | 10/2005 | Loushine | 370/328 |
| 2006/0099961 A1* | 5/2006 | Duan | 455/456.2 |
| 2006/0242307 A1* | 10/2006 | Jung et al. | 709/227 |
| 2006/0258369 A1* | 11/2006 | Burroughs et al. | 455/456.1 |
| 2007/0287412 A1* | 12/2007 | Ge et al. | 455/404.2 |

FOREIGN PATENT DOCUMENTS

| | | |
|---|---|---|
| CN | 1388713 | 1/2003 |
| JP | 8-321895 | 12/1996 |
| WO | WO 00/25545 | 5/2000 |
| WO | WO 02/080472 A1 | 10/2002 |
| WO | WO 03/034770 A1 | 4/2003 |

* cited by examiner

DISPOSAL METHOD OF LOCATION INFORMATION REQUEST IN LOCATION SERVICE

CROSS-REFERENCE TO RELATED APPLICATIONS

This application claims priority to Patent Cooperation Treaty (PCT) Application No. PCT/CN2004/000737 filed Jul. 2, 2004, entitled, A DISPOSAL METHOD OF LOCATION INFORMATION REQUEST IN THE LOCATION SERVICE, which claims priority to Chinese Patent Application No. 03146220.0 filed Jul. 4, 2003, all of the disclosure of which is hereby incorporated by reference in its entirety.

FIELD OF THE TECHNOLOGY

The present invention relates to locating technique, more particularly to a method for processing a location information request in a location service.

BACKGROUND OF THE INVENTION

A Location Service (LCS) in a mobile communication network is to acquire location information of a target User Equipment (UE) by means of locating technique, where the target UE refers to a positioned user equipment terminal in a mobile communication network, and the location information can be geological latitude/longitude information or location information of local streets. The location information acquired by a LCS system can be provided for the target UE for self-locating; or provided for the communication system itself for region charging or operation maintenance; or provided for other client application terminals requesting for location information of the target UE, such as an organization or an individual, for value-added service. Therefore, location services are of wide application in terms of emergency succor, vehicle guidance and intelligent traffic system, working schedule and team management, mobile yellow page inquiry, network performance enhancement and other aspects. In the 3rd Generation Partnership Project (3GPP), LCS specification as well as function model, structure, status description, message flow and other aspects of the whole LCS system is all described.

FIG. 1 is a schematic diagram illustrating logic structure of a LCS network, as shown in FIG. 1, in terms of function logic, functional logic entities for implementing a location service comprises a request end 101, a network with LCS system 106 and a target UE 107. The network with LCS system 106 comprises a Gateway Mobile Location Center (GMLC) 102, a user data storage server (HLR/HSS) 103, a Central Network (CN) 104 and a Radio Access Network (RAN) 105. Request end 101 comprises a requester and a LCS client. The LCS client refers to a software entity or a hardware entity that is used for obtaining location information of one or more target UE 107 and is interfaced with the network with LCS system 106. The requester refers to a request application client end requesting for location information of target UE 107, such as an organization or an individual, and is an initiator of a location request. The LCS client end can also be a requester at the same time. GMLC 102 provides a standard LCS interface for information intercommunication between the request end and the network with LCS system 106, checks privacy for request end 101 as well as for the location information request sent by request end 101. If both the privacy checks are passed, GMLC 102 will send a request for locating target UE 107 to CN 104. CN 104 cooperates with RAN 105 to locate target UE 107 and returns locating result of target UE 107 to GMLC 102. Finally, GMLC 102 sends locating result of target UE 107 to request end 101. GMLC 102 may further comprise a Requesting GMLC (R-GMLC) 108, a Home GMLC (H-GMLC) 109 and a Visited GMLC (V-GMLC) 110. R-GMLC 108 is a GMLC located in the network with LCS system 106 and used for receiving a location information request for target UE 107 from request end 101. H-GMLC 109 is a GMLC located in the network with LCS system 106 to which target UE 107 is affiliated. V-GMLC 110 is a GMLC located in the network with LCS system 106 which target UE 107 is currently visiting, namely is a GMLC of the network with LCS system 106 that target UE 107 is currently located. R-GMLC 108, H-GMLC 109 and V-GMLC 110 can be either integrated in one physical entity or disposed in different entities. R-GMLC 108 and H-GMLC 109 are connected through an Lr interface and so are H-GMLC 109 and V-GMLC 110. Request end 101 and R-GMLC 108 are connected through an Le interface. HLR/HSS 103 is used for storing user data and providing relevant information of user equipment for logic entities of other networks, such as address information of H-GMLC 109, V-GMLC 110 and CN 104 corresponding to the user. CN 104 receives and processes the location request for target UE 107 from GMLC 102, cooperates with RAN 105 to locate target UE 107 and returns locating result of target UE 107 to GMLC 102.

At present, location information requests for a target UE from a request end are divided into two categories in the 3GPP LCS specification: immediate location information requests and delay location information requests. The processing to immediate location information requests is to locate target UE immediately after a LCS system receives a location information request for a target UE from a request end and to return locating result of the target UE to the request end right away. The processing for delay location information requests is to provide locating result of the target UE by the LCS system at a future time point or at the occurrence of a certain event.

FIG. 2 is a flowchart illustrating the processing of a request end initiating a location information request defined in the 3GPP LCS specification, as shown in FIG. 2, the processing of a request end initiating a location information request for a target UE comprises the following steps:

Steps 201~205: the request end sends a LCS Service Request to an R-GMLC, requesting the LCS system to provide location information of the target UE. After receiving the LCS Service Request, the R-GMLC transmits Send Routing Information for LCS to the HLR/HSS, requesting the HLR/HSS to provide address of the H-GMLC. After receiving the Send Routing Information for LCS, the HLR/HSS transmits Send Routing Information for LCS ACK to the R-GMLC and returns address information of the H-GMLC. After receiving the Send Routing Information for LCS ACK, the R-GMLC sends LCS Service Request to the H-GMLC, requesting for location information of the target UE. After receiving the LCS Service Request, the H-GMLC checks privacy for the R-GMLC as well as for the transmitted LCS Service Request, if both privacy checks are passed, step 206 will be executed; otherwise, the H-GMLC will send an error response to the R-GMLC.

Steps 206~209: the H-GMLC sends Send Routing Information for LCS to the HLR/HSS, requesting HLR/HSS to provide addresses of a V-GMLC and that of a CN. After receiving the Send Routing Information for LCS, the HLR/HSS transmits Send Routing Information for LCS ACK to the H-GMLC and returns address information of the V-GMLC and that of the CN. After receiving the Send Routing Information for LCS ACK, the H-GMLC sends LCS Service Request to the V-GMLC, requesting for location information of the target UE. After receiving the LCS Service Request, the V-GMLC cooperates with the CN and the RAN to locate the target UE.

Steps 210~211: after finishing locating for the target UE, the V-GMLC sends LCS Service Response to the H-GMLC and returns the locating result of the target UE. After receiving the LCS Service Response, the H-GMLC checks privacy for the location information of the target UE returned by the R-GMLC when necessary, if the privacy check is passed, step 212 will be executed; otherwise, the H-GMLC will send an error response to the R-GMLC.

Steps 212~213: the H-GMLC sends LCS Service Response to the R-GMLC, returning the locating result of the target UE. After receiving the LCS Service Response, the R-GMLC can transform the returned locating result of the target UE when necessary, for example, transform latitude/longitude information into local geographical information. The R-GMLC sends LCS Service Response to the request end, returning the final transformed locating result of the target UE to the request end.

The above description is just a basic procedure of a request end requesting a LCS system to provide location information of a target UE. It is defined in the 3GPP LCS specification that LCS Service Request sent to the R-GMLC from the request end can further contain a processing indication which may be a synchronous processing indication or an asynchronous processing indication, the R-GMLC processes the received LCS Service Request according to type of the processing indication. In the case of a synchronous processing indication, the R-GMLC performs synchronous processing for the received LCS Service Request. In contrast, in the case of an asynchronous processing indication, the R-GMLC performs asynchronous processing for the received LCS Service Request. Synchronous processing manner and asynchronous processing manner of the R-GMLC for LCS Service Request will be described in detail hereinafter.

FIG. 3 is a flowchart illustrating a synchronous processing for a location information request between a request end and an R-GMLC, as shown in FIG. 3, the implementation procedure of the synchronous processing comprises the following steps:

Steps 301~302: the request end sends a LCS Service Request containing a synchronous processing indication to the R-GMLC, the R-GMLC performs synchronous processing for the received LCS Service Request according to the synchronous processing indication and forwards this LCS Service Request to the H-GMLC. The H-GMLC checks privacy for this LCS Service Request, if the privacy check is passed, the H-GMLC forwards this LCS Service Request to the V-GMLC. After receiving the LCS Service Request, the V-GMLC cooperates with the CN and the RAN to locate the target UE. The V-GMLC returns a LCS Service Response containing locating result of the target UE to the H-GMLC, the H-GMLC forwards the LCS Service Response containing locating result of the target UE to the R-GMLC, and finally the R-GMLC returns the LCS Service Response containing locating result of the target UE to the request end.

If the V-GMLC succeeds in cooperating with the CN and the RAN to locate the target UE, the LCS Service Response will contain locating result of the target UE. In contrast, if the V-GMLC fails to cooperate with the CN and the RAN to locate the target UE, the LCS Service Response will contain a reason for the unsuccessful locating.

FIG. 4 is a flowchart illustrating an asynchronous processing for a location information request between a request end and an R-GMLC, as shown in FIG. 4, implementation procedure of the asynchronous processing comprises the following steps:

Steps 401~402: the request end sends a LCS Service Request containing an asynchronous processing indication to the R-GMLC, the R-GMLC performs asynchronous processing for the received LCS Service Request according to the asynchronous processing indication. The R-GMLC sends a LCS Service Response to the request end firstly, notifying the request end that the LCS Service Request for the target UE from the request end has been accepted and then releases the connection resource between the R-GMLC and the request end. After receiving the LCS Service Response, the request end releases the connection resource between the R-GMLC and itself. Then, the R-GMLC sends a LCS Service Request to the H-GMLC which forwards this LCS Service Request to the V-GMLC after the request end passes the privacy check which is performed by the H-GMLC. After receiving the LCS Service Request, the V-GMLC cooperates with the CN and the RAN to locate the target UE.

Step 403: after cooperating with the CN and the RAN to locate the target UE, the V-GMLC returns a LCS Service Response containing locating result of the target UE to the H-GMLC which then forwards the LCS Service Response containing locating result of the target UE to the R-GMLC. The R-GMLC reestablishes the connection between itself and the request end after receiving the LCS Service Response and returns a Location Information message containing locating result of the target UE to the request end.

If the V-GMLC succeeds in cooperating with the CN and the RAN to locate the target UE, the Location Information will contain locating result of the target UE. In contrast, if the V-GMLC fails to cooperate with the CN and the RAN to locate the target UE, the Location Information will contain a reason for the unsuccessful locating.

The above-mentioned processing indication can be determined according to type of the location information request for the target UE from the request end. For example, if the request end initiates an immediate location information request for the target UE, the request end will send a LCS Service Request containing a synchronous processing indication to the R-GMLC. In contrast, if the request end initiates a delay location information request for the target UE, the request end will send a LCS Service Request containing an asynchronous processing indication to the R-GMLC.

The above-noted LCS Service Request is an example of the location information request.

At present, in the LCS specification of 3GPP, a mechanism is defined at the Le interface between the R-GMLC and the request end as whether to perform synchronous processing or asynchronous processing for a location information request, while the Lr interface between the R-GMLC and the H-GMLC or that between the H-GMLC and the V-GMLC can only support synchronous processing for a location information request and cannot support asynchronous processing for a location information request. In this way, only after the V-GMLC has cooperated with the CN and the RAN to locate the target UE and returned a LCS Service Request containing locating result of the target UE to the H-GMLC, the connection resource between the V-GMLC and the H-GMLC can be released. At the same time, only after the H-GMLC has returned a LCS Service Request containing locating result of the target UE to the R-GMLC, the connection resource between the H-GMLC and the V-GMLC can be released. Due to difference of locating techniques and difference of locating precision required by a request end, a long time period may be needed when the V-GMLC cooperates with the CN and the RAN to locate the target UE. In such a case, since only synchronous processing is available among the R-GMLC, the H-GMLC and the V-GMLC, the connection resource between the R-GMLC and the H-GMLC as well as that between the H-GMLC and the V-GMLC cannot be released until locating for the target UE has been finished, leading to resource waste at Lr interface. Besides, if there is a long distance between the R-GMLC and the H-GMLC as well as between the H-GMLC and the V-GMLC, there will be a delay during message interaction procedure, the H-GMLC will wait a long time for V-GMLC response and the R-GMLC will wait a long time for H-GMLC response. In such a case, connection resource between the V-GMLC and the H-GMLC as well as that between the H-GMLC and the R-GMLC occupies a long time, wasting the connection resource between the V-GMLC and the H-GMLC as well as that between the H-GMLC and the R-GMLC, leading to resource waste at Lr interface.

SUMMARY OF THE INVENTION

In view of this, an object of the present invention is to provide a method for processing a location information request in a location service, so as to effectively save system resource of a LCS system and increase processing performance of a location service.

To achieve the above object, the present invention provides a method for processing a location information request in a location service, comprising:

A. a location information request initiator sending a location information request containing a processing indication to a location information request receiver; and B. after receiving the location information request, the location information request receiver determining whether to perform synchronous processing or asynchronous processing for the location information request according to type of the processing indication, and then implementing corresponding processing for the location information request.

Under the condition that the location information request receiver, in step B, determines to perform synchronous processing for the location information request according to type of the processing indication, the step of implementing corresponding processing for the location information request in step B comprises: after a LCS system locates the target UE, the location information request receiver sending a location information response containing locating result of the target UE to the location information request initiator.

Under the condition that the location information request receiver, in step B, determines to perform asynchronous processing for the location information request according to type of the processing indication, step B comprises:

B1. the location information request receiver sending a location service response to the location information request initiator, and releasing the connection resource between itself and the location information request initiator;

B2. after receiving the location service response, the location information request initiator releasing the connection resource between itself and the location information request receiver; and B3. after a LCS system locates the target UE, the location information request receiver reestablishing the connection between itself and the location information request initiator, and then sending a LCS service result containing locating result of the target UE to the location information request initiator.

The type of the processing indication is determined according to type of a processing indication type contained in a location information request received by the location information request initiator, or according to a parameter of quality of service contained in a location information request received by the location information request initiator, or according to address type of the location information request receiver, or according to any combinations of the above manners.

The location information request initiator may be a LCS client, while the location information request receiver is an R-GMLC.

The location information request initiator may be an R-GMLC, while the location information request receiver is an H-GMLC.

The location information request initiator may be an H-GMLC, while the location information request receiver is a V-GMLC.

According to this method provided in the present invention, a location information request initiator can adopt different processing manners for a location information request according to different situations, so that a location information request receiver can implement corresponding processing for the connection resource between itself and the location information request initiator according to the location information request processing manner determined by the location information request initiator. When asynchronous processing manner is adopted, system resource of the LCS system can be saved, avoiding resource waste at location service interface and increasing processing performance of a location service.

DETAILED DESCRIPTION OF THE INVENTION

The present invention will be described in detail hereinafter with reference to the accompanying drawings.

In the present invention, a location information request initiator can adopt different processing manners for a location information request according to different situations, so that a location information request receiver can implement corresponding processing for connection resource between itself and the location information request initiator, based on the location information request processing manner determined by the location information request initiator. In this way, when asynchronous processing manner is adopted for a location information request, system resource of a LCS system can be effectively saved. For example, by adding a mechanism for judging whether to perform synchronous processing or asynchronous processing for a location information request at Lr interface between an H-GMLC and an R-GMLC as well as that between a V-GMLC and an H-GMLC, the R-GMLC and the H-GMLC can adopt different processing manners for a location information request according to different situations, so as to save connection resource between the H-GMLC and the R-GMLC as well as that between the V-GMLC and the H-GMLC greatly in the case of asynchronous processing manner, avoiding resource waste at Lr interface and increasing processing performance of the LCS system.

When sending a LCS Service Request to an H-GMLC, according to principles set by itself, an R-GMLC determines whether to adopt synchronous processing procedure or asynchronous processing procedure for interaction between the R-GMLC and the H-GMLC. The LCS Service Request sent to the H-GMLC contains a processing indication indicating whether to perform synchronous processing or asynchronous processing for the LCS Service Request, and the H-GMLC processes the received LCS Service Request according to type of the processing indication. In the case of a synchronous processing indication, the H-GMLC will implement a synchronous processing for the received LCS Service Request. In contrast, in the case of an asynchronous processing indication, the H-GMLC will implement an asynchronous processing for the received LCS Service Request. And then, the H-GMLC determines the type of the processing indication which is to be contained in the LCS Service Request sent to the V-GMLC according to principles set by itself.

Synchronous processing and asynchronous processing for the LCS Service Request between an H-GMLC and an R-GMLC as well as that between a V-GMLC and an H-GMLC will be respectively described hereinafter.

Figure 1:
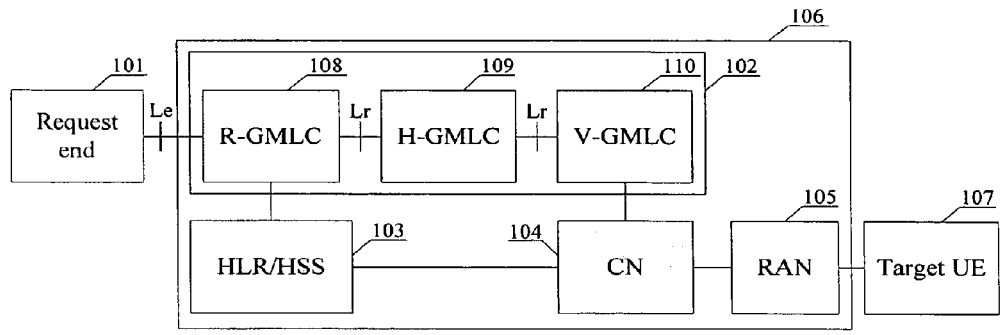
FIG. 1 is a schematic diagram illustrating logic structure of a LCS network.
Figure 2:
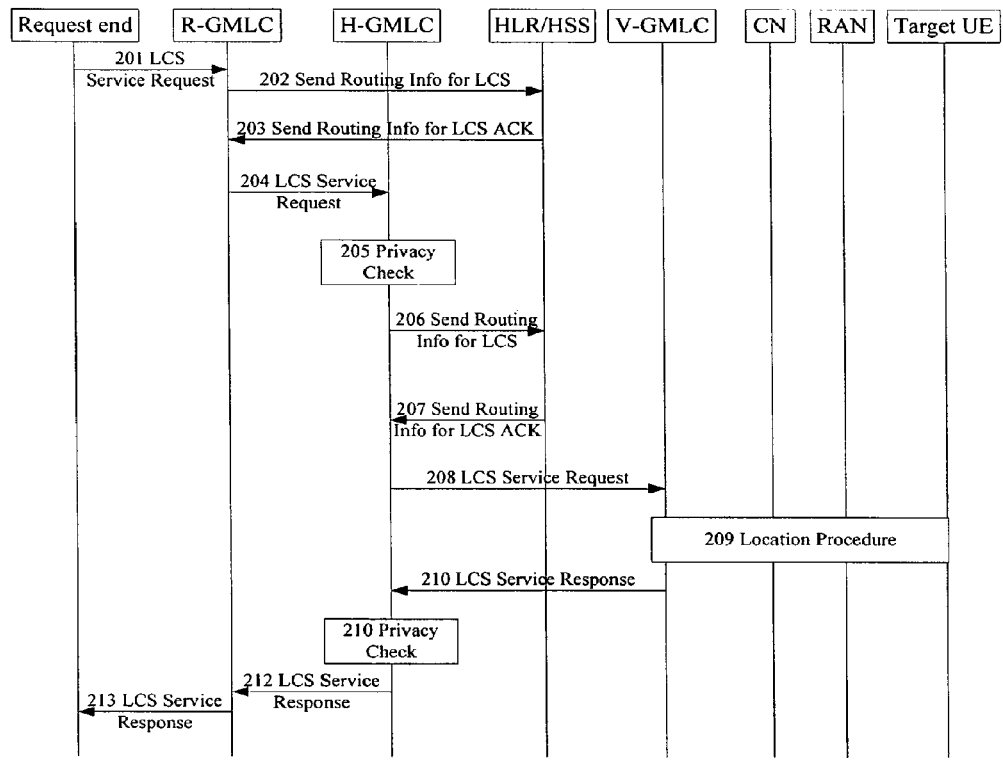
FIG. 2 is a flowchart illustrating processing of a request end initiating a location information request in 3GPP LCS specification.
Figure 3:
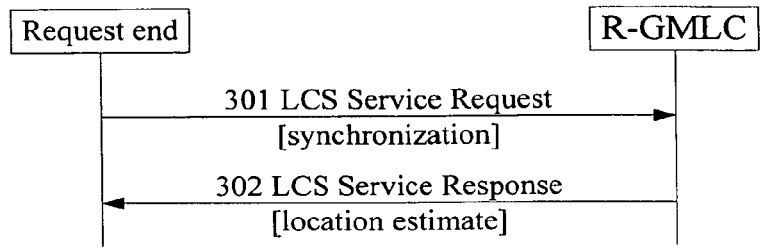
FIG. 3 is a flowchart illustrating synchronous processing for location information request between a request end and an R-GMLC.
Figure 4:
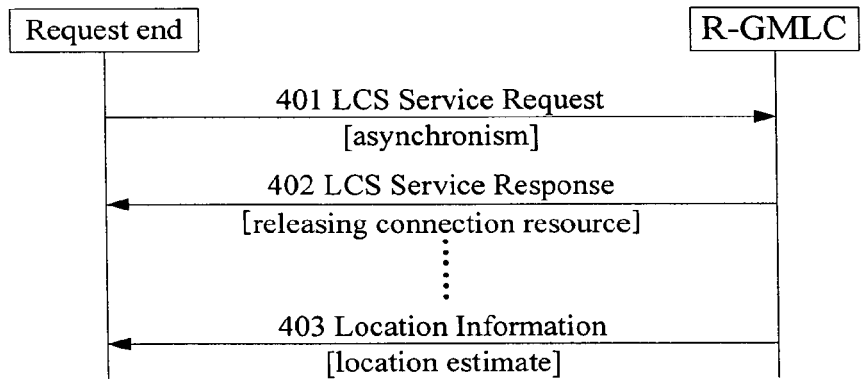
FIG. 4 is a flowchart illustrating asynchronous processing for location information request between a request end and an R-GMLC.
Figure 5:
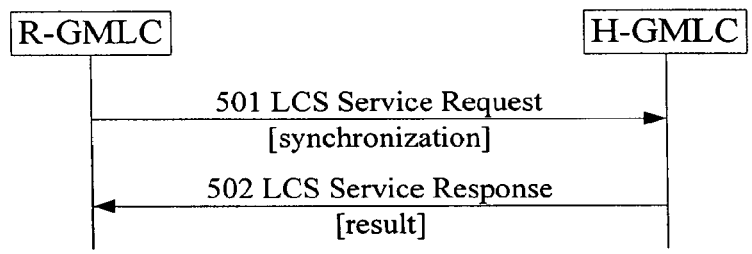
FIG. 5 is a flowchart illustrating synchronous processing for location information request between an R-GMLC and an H-GMLC.

FIG. 5 is a flowchart illustrating synchronous processing for a location information request between an R-GMLC and an H-GMLC, as shown in FIG. 5, the implementation procedure of the synchronous processing for a location information request between an R-GMLC and an H-GMLC comprises the following steps:

Steps 501~502: the R-GMLC sends a LCS Service Request containing a synchronous processing indication to the H-GMLC, and then the H-GMLC implements synchronous processing for the received LCS Service Request according to the synchronous processing indication, checks privacy for the received LCS Service Request. If the privacy check is passed, the H-GMLC forwards this LCS Service Request to the V-GMLC, the LCS Service Request containing a processing indication that is set according to the principle of the H-GMLC system and is used to indicate the V-GMLC whether to perform synchronous processing or asynchronous processing for this LCS Service Request. In contrast, if the privacy check is failed, the H-GMLC will reject the location information request for the target UE from the request end. After receiving the LCS Service Request, the V-GMLC processes the received LCS Service Request according to the type of the processing indication. In the case of a synchronous processing indication, the V-GMLC performs synchronous processing shown in FIG. 7 for the received LCS Service Request. In the case of an asynchronous processing indication, the V-GMLC performs asynchronous processing shown in FIG. 8 for the received LCS Service Request.

Figure 6:
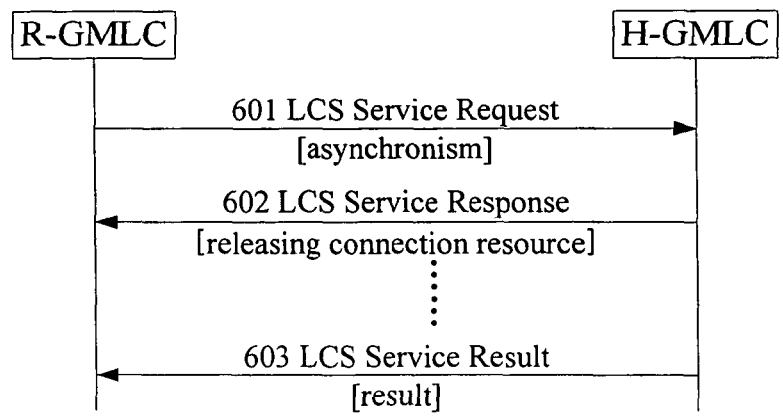
FIG. 6 is a flowchart illustrating asynchronous processing for location information request between an R-GMLC and an H-GMLC.

FIG. 6 is a flowchart illustrating asynchronous processing for a location information request between the R-GMLC and the H-GMLC, as shown in FIG. 6, the implementation procedure of asynchronous processing for a location information request between the R-GMLC and the H-GMLC comprises the following steps:

Steps 601~602: the R-GMLC sends a LCS Service Request containing an asynchronous processing indication to the H-GMLC. The H-GMLC implements asynchronous processing for the received LCS Service Request according to the asynchronous processing indication, sends a LCS Service Response to the R-GMLC, notifies the R-GMLC that the LCS Service Request has been received and releases the connection resource between itself and the R-GMLC. Then, the H-GMLC checks privacy for this LCS Service Request. If the request end passes the privacy check, the H-GMLC will forward this LCS Service Request to the V-GMLC. The V-GMLC cooperates with the CN and the RAN to locate the target UE after receiving this LCS Service Request. If the request end doesn't pass the privacy check, the H-GMLC will reject the location information request for the target UE from the request end. After receiving the LCS Service Response, the R-GMLC releases the connection resource between itself and the H-GMLC.

Step 603: after cooperating with the CN and the RAN to locate the target UE, the V-GMLC returns a LCS Service Result containing locating result of the target UE to the H-GMLC. The H-GMLC reestablishes the connection between itself and the R-GMLC and returns the LCS Service Result containing locating result of the target UE to the R-GMLC.

The R-GMLC determines the type of the processing indication which is to be contained in the LCS Service Request sent to the H-GMLC according to any of the following principles:

Principle 1: according to the type of the processing indication contained in the LCS Service Request sent from the request end, the R-GMLC determines the type of the processing indication which is to be contained in the LCS Service Request sent to the H-GMLC. For instance, if the LCS Service Request sent to the R-GMLC from the request end contains a synchronous processing indication, the LCS Service Request sent to the H-GMLC from the R-GMLC will also contain a synchronous processing indication accordingly; if the LCS Service Request sent to the R-GMLC from the request end contains an asynchronous processing indication, the LCS Service Request sent to the H-GMLC from the R-GMLC will also contain an asynchronous processing indication accordingly.

Principle 2: according to the parameter of Quality of Service (QoS) contained in the LCS Service Request sent from the request end, the R-GMLC determines the type of the processing indication which is to be contained in the LCS Service Request sent to the H-GMLC. If the locating precision required by the QoS parameter is high, the LCS system will spend a long time in locating the target UE. In such a case, in order to save the LCS system resource, the LCS Service Request sent to the H-GMLC from the R-GMLC will contain an asynchronous processing indication. Otherwise, the LCS Service Request sent to the H-GMLC from the R-GMLC will contain a synchronous processing indication.

Principle 3: according to address type of the H-GMLC, the R-GMLC determines the processing indication type which is to be contained in the LCS Service Request sent to the H-GMLC. The address type of the H-GMLC can be classified into a local address and a remote address. For example, if the address type of the H-GMLC is a local address, the LCS Service Request sent to the H-GMLC from the R-GMLC will contain a synchronous processing indication. In contrast, if the address type of the H-GMLC is a remote address, the LCS Service Request sent to the H-GMLC from the R-GMLC will contain an asynchronous processing indication.

When the R-GMLC determines the type of the processing indication which is to be contained in the LCS Service Request sent to the H-GMLC, any combination of the above principles is feasible. For instance, if the LCS Service Request sent to the R-GMLC from the request end contains a synchronous processing indication and a QoS parameter requiring high locating precision, the R-GMLC may send a LCS Service Request containing an asynchronous processing indication to the H-GMLC according to comprehensive analysis.

The above-described procedure of determining whether to perform synchronous processing or asynchronous processing for the LCS Service Request is performed at the Lr interface between the R-GMLC and the H-GMLC.

Figure 7:
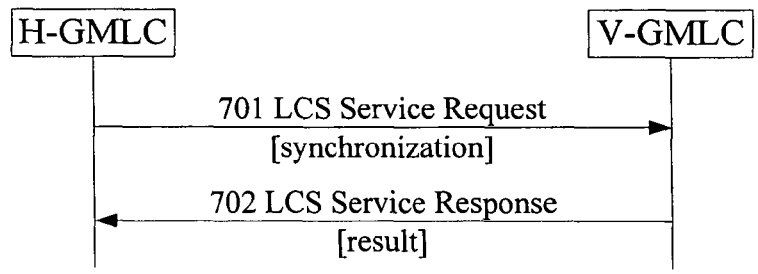
FIG. 7 is a flowchart illustrating synchronous processing for location information request between an H-GMLC and a V-GMLC.

FIG. 7 is a flowchart illustrating synchronous processing for a location information request between an H-GMLC and a V-GMLC, as shown in FIG. 7, the implementation procedure of synchronous processing for a location information request between an H-GMLC and a V-GMLC comprises the following steps:

Steps 701~702: the H-GMLC sends a LCS Service Request containing a synchronous processing indication to the V-GMLC. After receiving the LCS Service Request, the V-GMLC implements a synchronous processing for the LCS Service Request according to the synchronous processing indication, cooperates with the CN and the RAN to locate the target UE, and then returns a LCS Service Response containing locating result of the target UE to the H-GMLC.

Figure 8:
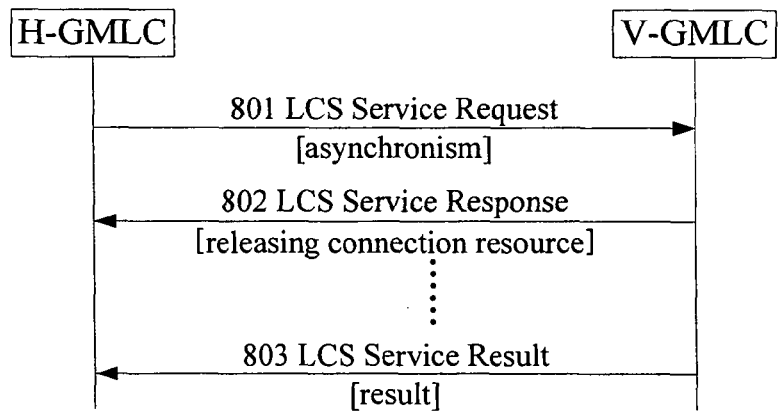
FIG. 8 is a flowchart illustrating asynchronous processing for location information request between an H-GMLC and a V-GMLC.

FIG. 8 is a flowchart illustrating asynchronous processing for a location information request between an H-GMLC and a V-GMLC, as shown in FIG. 8, the implementation procedure of asynchronous processing for a location information request between an H-GMLC and a V-GMLC comprises the following steps:

Steps 801~802: the H-GMLC sends a LCS Service Request containing an asynchronous processing indication to the V-GMLC. After receiving the LCS Service Request, the V-GMLC implements an asynchronous processing for the LCS Service Request according to the asynchronous processing indication, sends a LCS Service Response to the H-GMLC, notifies the H-GMLC that LCS Service Request has been received, and releases the connection resource between itself and the H-GMLC. After receiving the LCS Service Response, the H-GMLC releases the connection resource between itself and the V-GMLC.

Step 803: after cooperating with the CN and the RAN to locate the target UE, the V-GMLC reestablishes the connection resource between itself and the H-GMLC, and returns the LCS Service Result containing locating result of the target UE to the H-GMLC.

The H-GMLC determines the type of the processing indication which is to be contained in the LCS Service Request sent to the V-GMLC according to any of the following principles:

Principle 1: according to the type of the processing indication contained in the LCS Service Request sent from the R-GMLC, the H-GMLC determines the type of the processing indication which is to be contained in the LCS Service Request sent to the V-GMLC. For instance, if the LCS Service Request sent to the H-GMLC from the R-GMLC contains a synchronous processing indication, the LCS Service Request sent to the V-GMLC from the H-GMLC will also contain a synchronous processing indication accordingly; if the LCS Service Request sent to the H-GMLC from the R-GMLC contains an asynchronous processing indication, the LCS Service Request sent to the V-GMLC from the H-GMLC will also contain an asynchronous processing indication accordingly.

Principle 2: according to the parameter of QoS contained in the LCS Service Request sent from the R-GMLC, the H-GMLC determines the type of the processing indication which is to be contained in the LCS Service Request sent to the V-GMLC. If the locating precision required by the QoS parameter is high, the LCS system will spend a long time in locating the target UE. In such a case, in order to save the LCS system resource, the LCS Service Request sent to the V-GMLC from the H-GMLC will contain an asynchronous processing indication. Otherwise, the LCS Service Request sent to the V-GMLC from the H-GMLC will contain a synchronous processing indication.

Principle 3: according to address type of the V-GMLC, the H-GMLC determines the processing indication type which is to be contained in the LCS Service Request sent to the V-GMLC. The address type of the V-GMLC can be classified into a local address and a remote address. For example, if the address type of the V-GMLC is a local address, the LCS Service Request sent to the V-GMLC from the H-GMLC will contain a synchronous processing indication. In contrast, if the address type of the V-GMLC is a remote address, the LCS Service Request sent to the V-GMLC from the H-GMLC will contain an asynchronous processing indication.

When the H-GMLC determines the type of the processing indication which is to be contained in the LCS Service Request sent to the V-GMLC, any combination of the above principles is feasible. For instance, if the LCS Service Request sent to the H-GMLC from the R-GMLC contains a synchronous processing indication and a QoS parameter requiring high locating precision, the H-GMLC may send a LCS Service Request containing an asynchronous processing indication to the V-GMLC according to comprehensive analysis.

The above-described procedure of determining whether to perform synchronous processing or asynchronous processing for the LCS Service Request is performed at the Lr interface between the H-GMLC and the V-GMLC.

In practical application, a request end initiates a location information request for a target UE, requesting a LCS system to provide the current location information of the target UE. The request end sends a LCS Service Request containing a synchronous processing indication to an R-GMLC. After receiving the LCS Service Request, the R-GMLC enters a synchronous processing procedure for the location information request. After obtaining the address information of the H-GMLC where the target UE is affiliated, the R-GMLC determines that QoS parameter contained in the LCS Service Request requires high locating precision and the LCS system thus needs a long time to locate the target UE, so the R-GMLC determines to adopt asynchronous processing for the LCS Service Request with the H-GMLC and sends a LCS Service Request containing an asynchronous processing indication to the H-GMLC. After receiving the LCS Service Request, the H-GMLC performs asynchronous processing for this LCS Service Request, sends a LCS Service Response to the R-GMLC and then releases the connection resource between itself and the R-GMLC. After receiving the LCS Service Response, the R-GMLC releases the connection resource between itself and the H-GMLC.

The H-GMLC checks privacy for the LCS Service Request. If the privacy check is passed, the H-GMLC determines a processing manner for the LCS Service Request according to the address type of the V-GMLC which is obtained through a HLR/HSS. If the address type of the V-GMLC is a local address, synchronous processing will be adopted for the LCS Service Request between the H-GMLC and the V-GMLC. In such a case, the H-GMLC sends a LCS Service Request containing a synchronous processing indication to the V-GMLC. The V-GMLC performs synchronous processing for the received LCS Service Request after receiving it, cooperates with the CN and the RAN to locate the target UE, and then returns a LCS Service Result containing the locating result of the target UE to the H-GMLC. After receiving the LCS Service Result, the H-GMLC reestablishes the connection between itself and the R-GMLC and returns the LCS Service Result containing locating result of the target UE to the R-GMLC. After receiving the LCS Service Result, the R-GMLC returns the LCS Service Result containing locating result of the target UE to the request end.

Therefore, it is appreciated that the foregoing description is a demonstration of the rather than limitation to the present invention.

The invention claimed is:

1. A method for processing a location information request in a location service, the method comprising:

a second Gateway Mobile Location Center receiving a location information request sent from a first Gateway Mobile Location Center, the location information request containing a processing indication, and type of the processing indication being used for indicating synchronous processing or asynchronous processing; and after receiving the location information request, the second Gateway Mobile Location Center performing either synchronous processing or asynchronous processing for the location information request according to the type of the processing indication, and then implementing corresponding processing for the location information request;

wherein, when the second Gateway Mobile Location Center performs synchronous processing for the location information request according to the type of the processing indication, implementing corresponding processing for the location information request comprises the second Gateway Mobile Location Center sending a location information response containing locating result of a target UE to the first Gateway Mobile Location Center after a LCS system locates the target UE.

2. The method according to claim 1, wherein, when the second Gateway Mobile Location Center performs asynchronous processing for the location information request according to the type of the processing indication, implementing corresponding processing for the location information request comprises:

the second Gateway Mobile Location Center sending a location service response to the first Gateway Mobile Location Center, and releasing a connection resource between itself and the first Gateway Mobile Location Center;

after receiving the location service response, the first Gateway Mobile Location Center releasing a connection resource between itself and the second Gateway Mobile Location Center; and after a LCS system locates the target UE, the second Gateway Mobile Location Center reestablishing the connection between itself and the first Gateway Mobile Location Center, and then sending a LCS service result containing locating result of the target UE to the first Gateway Mobile Location Center.

3. The method according to claim 1, wherein the type of the processing indication is determined according to type of a processing indication contained in a location information request received by the first Gateway Mobile Location Center, or according to a parameter of quality of service contained in a location information request received by the first Gateway Mobile Location Center, or according to address type of the second Gateway Mobile Location Center, or according to any combinations of the above manners.

4. The method according to claim 1, wherein the first Gateway Mobile Location Center is a Requesting Gateway Mobile Location Center, R-GMLC, while the second Gateway Mobile Location Center is a Home Gateway Mobile Location Center, H-GMLC.

5. The method according to claim 1, wherein the first Gateway Mobile Location Center is a Home Gateway Mobile Location Center, H-GMLC, while the second Gateway Mobile Location Center is a Visited Gateway Mobile Location Center, V-GMLC.

6. A system for processing location service, comprising:

a first Gateway Mobile Location Center, capable of sending out a first location information request, the first location information request containing a processing indication, wherein type of the processing indication is used for indicating synchronous processing or asynchronous processing; and a second Gateway Mobile Location Center, capable of receiving the first location information request, performing synchronous processing or asynchronous processing according to the type of the processing indication contained in the first location information request, and implementing corresponding processing in response to the first location information request;

wherein when the second Gateway Mobile Location Center performs synchronous processing for the first location information request according to the type of the processing indication, the second Gateway Mobile Location Center is capable of sending a location information response containing locating result of a target UE to the first Gateway Mobile Location Center after a LCS system locates the target UE; and wherein when the second Gateway Mobile Location Center performs asynchronous processing for the first location information request according to the type of the processing indication, the second Gateway Mobile Location Center is capable of sending a location service response to the first Gateway Mobile Location Center, and releasing connection resource between itself and the first Gateway Mobile Location Center, and after receiving the location service response, the first Gateway Mobile Location Center is capable of releasing the connection resource between itself and the second Gateway Mobile Location Center; and after a LCS system locates a target UE, the second Gateway Mobile Location Center is capable of reestablishing the connection between itself and the first Gateway Mobile Location Center, and then sending a LCS service result containing locating result of the target UE to the first Gateway Mobile Location Center.

7. The system according to claim 6, wherein the first Gateway Mobile Location Center is a Home Gateway Mobile Location Center, H-GMLC, and the second Gateway Mobile Location Center is a Visited Gateway Mobile Location Center, V-GMLC.

8. The system according to claim 6, wherein the first Gateway Mobile Location Center is a Requesting Gateway Mobile Location Center, R-GMLC, and the second Gateway Mobile Location Center is a Home Gateway Mobile Location Center, H-GMLC.

9. The system according to claim 8, further comprising: a third Gateway Mobile Location Center; wherein
   the second Gateway Mobile Location Center is further capable of sending out a second location information request, the second location information request containing a processing indication; and
   the third Gateway Mobile Location Center is capable of receiving the second location information request, performing synchronous processing or asynchronous processing according to type of the processing indication contained in the second location information request, and implementing corresponding processing in response to the second location information request.

10. The system according to claim 9, wherein the third Gateway Mobile Location Center is a Visited Gateway Mobile Location Center, V-GMLC.

11. A Gateway Mobile Location Center device for processing location service, comprising:
   a first unit, capable of receiving a location information request from another Gateway Mobile Location Center device, the location information request containing a processing indication, wherein type of the processing indication is used for indicating synchronous processing or asynchronous processing;
   a second unit, capable of performing synchronous processing or asynchronous processing according to the type of the processing indication contained in the location information request, and implementing corresponding processing in response to the location information request; and
   when the second unit performs synchronous processing for the location information request according to the type of the processing indication, the second unit is capable of sending a location information response containing locating result of a target UE to the another Gateway Mobile Location Center device after a LCS system locates the target UE; and
   when the second unit performs asynchronous processing for the location information request according to the type of the processing indication, the second unit is capable of sending a location service response to the another Gateway Mobile Location Center device, and releasing connection resource between the Gateway Mobile Location Center device of the second unit and the another Gateway Mobile Location Center device, and after a LCS system locates a target UE, the second unit is capable of reestablishing the connection between the Gateway Mobile Location Center device of the second unit and the another Gateway Mobile Location Center device, and then sending a LCS service result containing locating result of the target UE to the another Gateway Mobile Location Center device.

12. The device according to claim 11, wherein the Gateway Mobile Location Center device is a Home Gateway Mobile Location Center, H-GMLC, or a Visited Gateway Mobile Location Center, V-GMLC.

13. A method for processing a location information request in a location service, comprising:
   a location information request initiator sending a location information request containing a processing indication to a location information request receiver, and type of the processing indication being used for indicating synchronous processing or asynchronous processing;
   after receiving the location information request, the location information request receiver performing synchronous processing or asynchronous processing for the location information request according to the type of the processing indication; and
   when the location information request receiver performs synchronous processing for the location information request according to the type of the processing indication, the location information request receiver sending a location information response containing locating result of a target UE to the location information request initiator after a LCS system locates the target UE;
   when the location information request receiver performs asynchronous processing for the location information request according to the type of the processing indication, the location information request receiver sending a location service response to the location information request initiator, and releasing the connection resource between itself and the location information request initiator, and after receiving the location service response, the location information request initiator releasing the connection resource between itself and the location information request receiver; and after a LCS system locates the target UE, the location information request receiver reestablishing the connection between itself and the location information request initiator, and then sending a LCS service result containing locating result of the target UE to the location information request initiator.

14. The method according to claim 13, wherein the type of the processing indication is determined according to type of a processing indication contained in a location information request received by the location information request initiator, or according to a parameter of quality of service contained in a location information request received by the location information request initiator, or according to address type of the location information request receiver, or according to any combinations of the above manners.

* * * * *